United States Patent [19]

Nocera

[11] Patent Number: 4,702,512
[45] Date of Patent: Oct. 27, 1987

[54] ADJUSTABLE WORKPIECE SECURING DEVICE

[76] Inventor: Patrick C. Nocera, 719 Van Buren Ave., Elizabeth, N.J. 07201

[21] Appl. No.: 896,841

[22] Filed: Aug. 14, 1986

[51] Int. Cl.⁴ .............................................. B25B 1/00
[52] U.S. Cl. ...................................... 269/77; 269/97; 269/236
[58] Field of Search ............... 269/235, 236, 229, 239, 269/77, 78, 91, 93, 94, 95, 97; 408/103, 109, 95, 97, 98

[56] References Cited

U.S. PATENT DOCUMENTS

| | | | |
|---|---|---|---|
| 304,963 | 9/1884 | Shepard et al. | 269/236 |
| 873,077 | 12/1907 | Patnod | 269/239 |
| 1,225,301 | 5/1917 | Wolfe | 269/77 |
| 2,486,638 | 11/1949 | Eshleman | 269/235 |
| 3,345,889 | 10/1967 | Yunt et al. | 269/236 |
| 4,025,064 | 5/1977 | Disston et al. | 269/97 |
| 4,140,308 | 2/1979 | Disston et al. | 269/97 |

FOREIGN PATENT DOCUMENTS

| | | | |
|---|---|---|---|
| 28236 | 4/1921 | Denmark | 269/236 |
| 213825 | 4/1924 | United Kingdom | 269/239 |

*Primary Examiner*—Robert C. Watson
*Attorney, Agent, or Firm*—Lerner, David, Littenberg, Krumholz & Mentlik

[57] ABSTRACT

An adjustable workpiece securing device is disclosed for securing a workpiece to a support while performing one or more machining operations thereon. The device incorporates a cam assembly for application of a force to the displaceable end of a substantially immovable bar to secure the workpiece to its underlying support. The construction of the device to include non-movable elements in those portions which effect the securing of the workpiece, results in the precision alignment of the workpiece with respect to a machine cutting element that can be effectively maintained during the machining operation.

19 Claims, 6 Drawing Figures

ADJUSTABLE WORKPIECE SECURING DEVICE

BACKGROUND OF THE INVENTION

The present invention relates in general to an adjustble workpiece securing device and, more particularly, to such a device for positioning and securing in place a workpiece relative to a workpiece support during a machining operation, such as, for instance, a drilling operation, a milling operation, a sawing operation, or the like.

A known difficulty, in addition to safety considerations, which is frequently experienced while performing a machining operation on a workpiece is that of maintaining a specific relationship between the workpiece and the machine cutting element. This is particularly difficult if the workpiece is relatively small or the number of pieces to be fabricated does not justify the construction and utilization of a specially designed holding fixture. A special holding fixture is often constructed for mass production, however, being uneconomical when fabricating only a few pieces, such as models, prototypes and specialty items. To this end, one of the more commonly adopted solutions for holding the workpiece in place and positioning the workpiece relative to the machine cutting element is the utilization of vises, vise grips, adjustable clamps, staples, and the like. While these devices have utility, they do, however, possess a number of disadvantages, such as, they do not permit a workpiece to be locked into position and to be released practically immediately, as and when required.

There is known from U.S. Pat. Nos. 4,477,063, 3,345,889, 2,813,559, 2,486,638 and 552,814, a number of devices suitable for securing a workpiece to a workpiece support so as to enable the performing of a machining operation. Although these devices have utility and have been employed to some degree of success, such devices possess a number of disadvantages which limit their usefulness while forming precision machining operations. For example, these devices are constructed to include a number of interrelated elements which are movable relative to one another in such a manner which permits shifting of the workpiece, to at least a certain degree, during the machining operation. Any such movement, even of the smallest magnitude, will affect the ability to manufacture precision pieces, when taking into consideration the small tolerances which may be specified. Other known workpiece securing devices are disclosed in U.S. Pat. Nos. 3,127,162, 3,697,060, 3,243,055, 2,815,052 and 3,301,548. Similarly, these known devices possess a number of disadvantages which preclude their ability to efficiently and precisely secure a workpiece during a subsequent machining operation.

Accordingly, it can be appreciated that there is an unsolved need for an adjustable workpiece securing device which, in addition to being easily adjustable to workpieces of different sizes and shapes, is constructed to maintain precision alignment of the workpiece during a machining operation in a simple and effective manner.

SUMMARY OF THE INVENTION

It is broadly an object of the present invention to provide an adjustable workpiece securing device which overcomes or avoids one or more of the foregoing disadvantages resulting from the use of the aforementioned devices and which meets the specific requirements of such an adjustable device for use in precision securing of a workpiece relative to a machine cutting element during a machining operation.

Specifically, it is within the contemplation of one aspect of the present invention to provide a device for securing a workpiece to a support having a column member. The device is constructed of a locking assembly securable to a portion of the column member, a first member having a secured end attached to the locking assembly and a displaceable end adapted for engaging the workpiece, a second member having a first end coupled to the first member adjacent the displaceable end and a second end coupled to the locking assembly, and cam means in operative association with the second member for displacing the displaceable end of the first member, whereby the displaceable end of the first member is brought into engagement with the workpiece for securing the workpiece to the support.

In accordance with another embodiment of the present invention, there is provided a device for securing a workpiece to a support having a column member. The device is constructed of a locking assembly securable to a portion of the column member, a first member having a secured end attached to the locking assembly and a displaceable end adapted for engaging the workpiece, a second member having a first end coupled to the first member adjacent the displaceable end and a second end coupled to the locking assembly, and a cam assembly coupling the second end of the second member to the locking assembly about an eccentric path, the cam assembly operative for bringing the displaceable end of the first member into engagement with the workpiece upon movement of the second member by the cam assembly, whereby the workpiece is secured to the support.

In accordance with another embodiment of the present invention, there is provided a device for securing a workpiece to a support having a column member. The device is constructed of a locking assembly releasably securable to a portion of the column member, a longitudinally extending first member having a secured end fixedly attached to the locking assembly and a displaceable end adapted for engaging the workpiece, the first member constructed to be flexible to accommodate displacement of the displaceable end, a first bearing block secured to the first member adjacent the displaceable end, a second bearing block secured to the locking assembly, a longitudinally extending second member having a first end coupled to the first bearing block and a second end coupled to the second bearing block, and a cam assembly coupling the second end of the second member to the second bearing block, the cam assembly comprising a shaft supporting a cam about which the second end of the second member is coupled for movement about an eccentric path in response to the rotation of the shaft, the cam assembly operative to bring the displaceable end of the first member into engagement with the workpiece upon movement of the second member, whereby the workpiece is secured to the support.

BRIEF DESCRIPTION OF THE DRAWINGS

The above description, as well as further objects, features and advantages of the present invention will be more fully understood by reference to the following detailed description of the presently preferred, but nonetheless illustrative, adjustable workpiece securing device in accordance with the present invention, when taken in conjunction with the accompanying drawings, wherein.

DETAILED DESCRIPTION

Figure 1:
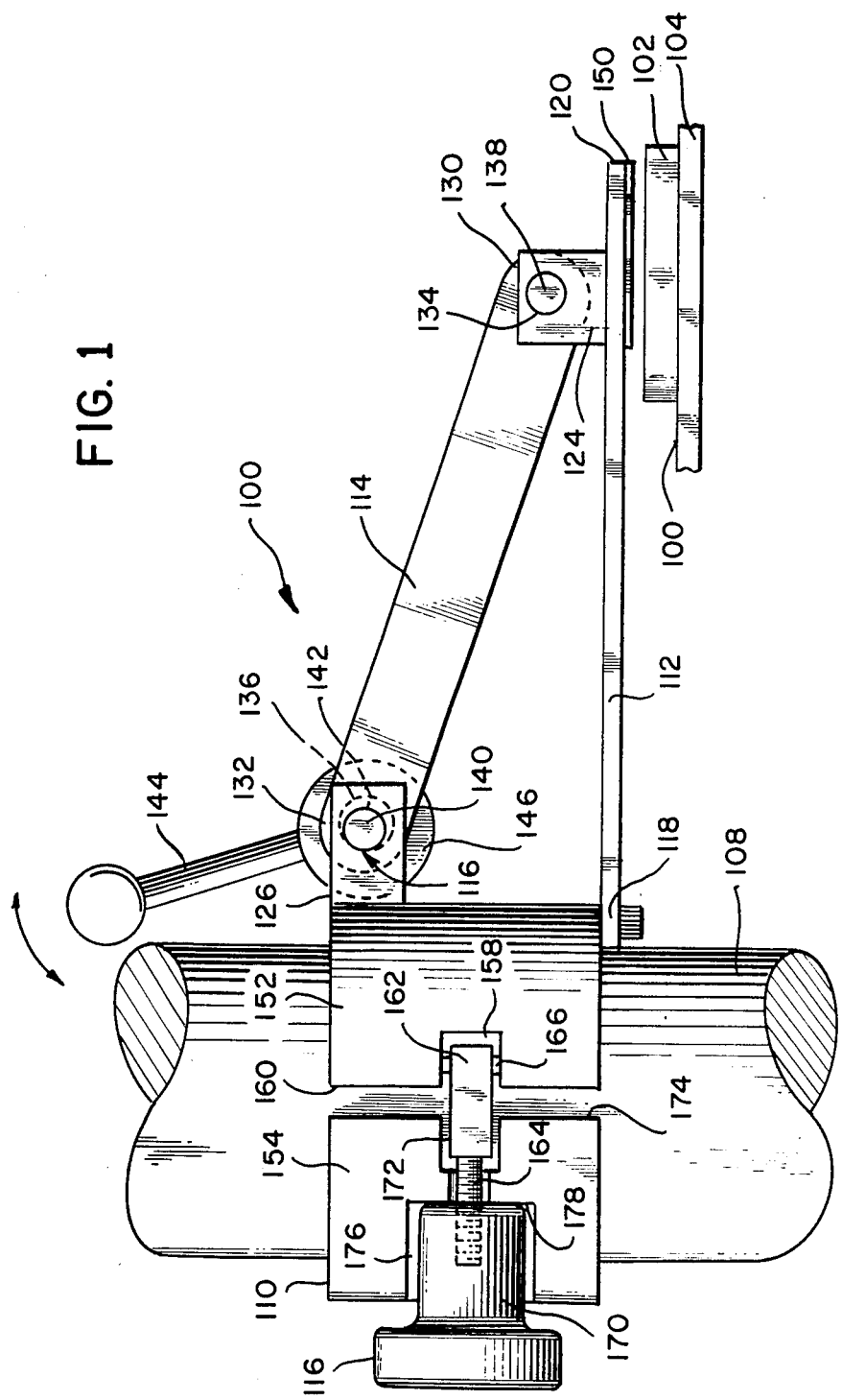
FIG. 1 is a front elevational view of the workpiece securing device, constructed in accordance with the present invention, arranged overlying a workpiece support and releasably attached to a column member by means of a locking assembly.
Figure 2:
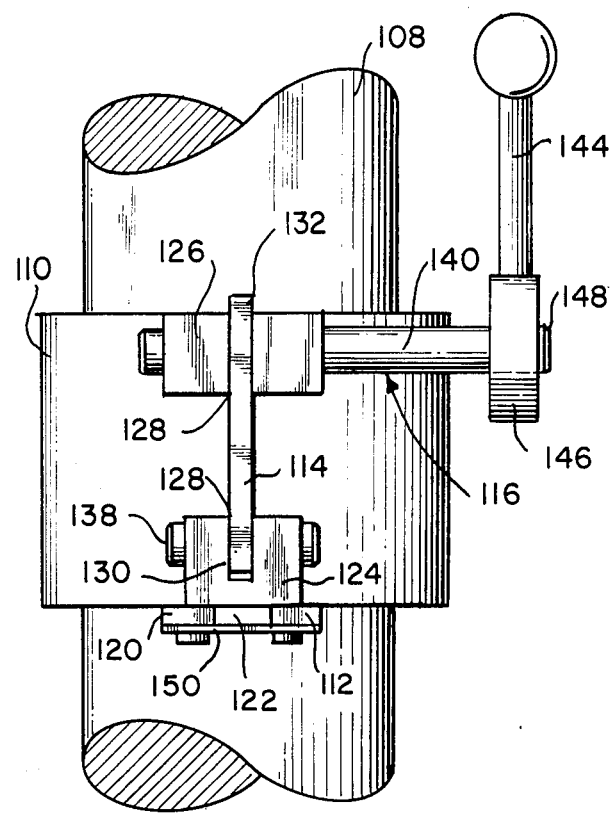
FIG. 2 is a side elevational view, taken from the right in FIG. 1, showing the workpiece securing device in further assembled detail.

Referring now to the drawings, wherein like reference numerals represent like elements, there is shown in FIG. 1 an adjustable workpiece securing device generally designated by reference numeral 100. As shown, the device 100 is operative for securing a workpiece 102 to a workpiece support 104 having a workpiece supporting surface 106. Arranged adjacent the supporting surface 106, and extending transversely upward from the workpiece support 104 is a column member 108. The elements, as thus far described, may comprise a drill press or other such apparatus adapted to perform a machining operation. To this end, the column member 108 may be secured to the workpiece support 104, or in the alternative, may be arranged adjacent thereto and supported by a secondary fixture (not shown). The workpiece 102 may therefore be subjected to a variety of machining operations, for example, a drilling operation, a milling operation, a sawing operation, or the like.

Figure 3:
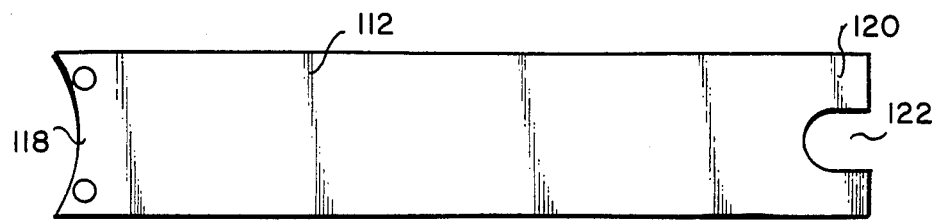
FIG. 3 is a top plan view showing an element of the workpiece securing device comprising a flexible, longitudinally extending bar, having a notch at one end thereof.
Figure 4:
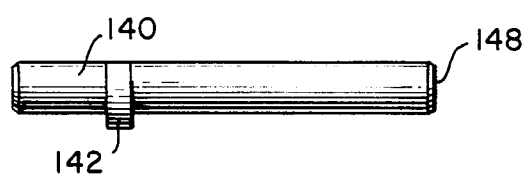
FIG. 4 is a side elevational view showing an element of the workpiece securing device comprising an elongated shaft supporting an eccentrically mounted cam.
Figure 5:
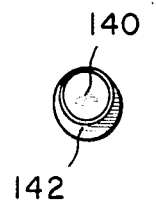
FIG. 5 is a side elevational view, taken from the right in FIG. 4, showing the eccentric arrangement between the shaft and the cam.

Referring now to FIGS. 1–5, the device 100 is constructed generally of a locking assembly 110, a first longitudinally extending bar 112, a second longitudinally extending bar 114 and a cam assembly 116. The first bar 112 has a secured end designated 118 fixedly secured to a portion of the locking assembly 110, for example, by means of welding or bolting, to prevent relative movement therebetween. The first bar 112 further has a displaceable end designated 120 provided with a U-shaped notch 122, as shown in FIG. 3. The first bar 112 is constructed of suitable material to allow a degree of flexibility along its longitudinal axis during operation of the device 100 for securing a workpiece 102 to the workpiece support 104. Suitable materials may include industrial plastics, mild steel, and other metals which have a degree of resiliency to prevent their cracking or failure resulting from mechanical fatigue or the like during the flexing operation.

A first bearing block 124 is secured to the first bar 112 adjacent its displaceable end 120. A second bearing block 126 is secured to a portion of the locking assembly 110 overlying and spaced from the secured end 118 of the first bar 112. The first and second bearing blocks 124, 126 are each provided with a slot 128 adapted to receive one end of the second bar 114. In this regard, the second bar 114 is provided with a first end designated 130 and a second end designated 132, each having a circular opening 134, 136, respectively. The first end 130 of the second bar 114 is coupled to the first bearing block 124 by a shaft 138 extending through opening 134. The opening 136 and shaft 138 are dimensioned to permit relative pivotal movement between the second bar 114 and the shaft. The second end 132 of the second bar 114 is coupled to the second bearing block 126 by means of the cam assembly 116.

The cam assembly 116 is constructed of a longitudinally extending shaft 140 having a cam 142 eccentrically mounted about a portion thereof and a handle 144 secured to another portion thereof by a collar 146. Specifically, the handle 144 is secured at one end of the shaft 140 designated 148, which is remote from the cam 142, so as to provide effective mechnical advantage. The shaft 140 of the cam assembly 116 extends through the second bearing block 126 such that the cam 142 is positioned within the opening 136 within the second end 132 of the second bar 114. The dimensions and shape of the cam 142 with respect to the opening 136 are such to permit rotational or pivotal movement about an eccentric path upon rotation of the shaft 140 about its longitudinal axis by means of the handle 144. The device 100 is completed by the provision of a resilient pad 150 attached to the bottom surface of the first bar 112 at its displaceable end 120. The resilient pad 150 can be constructed of a variety of materials, for example, polyurethane, synthetic and natural rubbers and the like.

Figure 6:
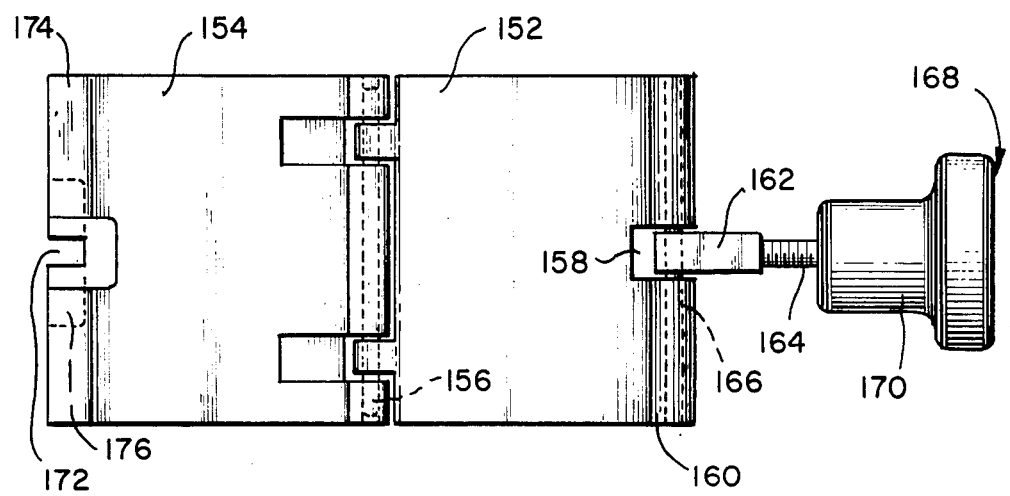
FIG. 6 is a front elevational view showing the locking assembly in an opened arrangement prior to attaching to the column member.

Referring now to FIGS. 1 and 6, the construction of the locking assembly 110 will now be described. The locking assembly 110 is constructed of a first C-shaped half 152 pivotally coupled to a like second C-shaped half 154 by means of a longitudinally extending, transversely inserted pin 156. The first and second C-shaped halves 152, 154 are accordingly adapted to form an enclosed opening for receiving the column member 108. The first C-shaped half 152 is provided with a notched opening 158 arranged centrally and extending inwardly from a peripheral edge 160. A rectangular member 162 having a threaded post 164 extending therefrom is pivotally coupled within the notched opening 158 by means of a transversely inserted pin 166. A handle 168 having a reduced diameter section 170 is threadingly received upon the threaded post 164.

The second C-shaped half 154 is provided with a notched opening 172 extending inwardly from a peripheral edge 174. The notched opening 172 opens into a recess 176 formed within an outer surface portion of the second C-shaped half 154 and forming a shoulder 178, as shown n FIG. 1. The recess 176 is dimensioned so as to receive a portion of the reduced diameter section 170 of the handle 168.

The construction and particular arrangement of the elements of the device 100 having now been described, a description of the operation of the device for securing a workpiece 102 to the supporting surface 106 of a workpiece support 104 will now follow. The locking assembly 110 is enclosed about a portion of the column member 108 and secured thereat to prevent relative movement therebetween. In this regard, the member 162 is pivoted about pin 166 so as to be received within notched opening 172 while the reduced diameter section 170 of the handle 168 is received within the recess 176 of the second C-shaped half 154. Upon rotation of the handle 168 so as to effect increasing threaded engagement with the threaded post 164, the reduced diameter section 170 is brought into engagement with the shoulder 178 so as to pull the first and second C-shaped halves 152, 154 together into secured relationship about the column member 108. The locking assembly 110 is positioned such that the resilient pad 150 attached to the displaceable end 120 of the first bar 112 is arranged overlying and spaced slightly from the exposed surface of the workpiece 102.

After manipulation of the workpiece 102 such that the portion thereof to be machined is exposed within the U-shaped notch 122 within the displaceable end 120 of the first bar 112, the workpiece is secured to the supporting surface 106 of the workpiece support 104 by means of the device 100. This is achieved by rotation of the handle 144 over a limited arc in a clockwise direction, as shown in FIG. 1. Rotation of the handle 144 rotates the shaft 140 and cam 142 which is received within the opening 136 within the second end 132 of the second member 114. The rotation of the cam 142 causes movement of the second end 132 of the second member 114 about an eccentric path resulting in the transmission and application of a mechanical force in a substantially downward direction at its first end 130 which is coupled to the first bearing block 124. In effect, this downward force is transmitted to the displaceable end 120 of the first bar 112 which is displaced downwardly due to its flexible nature, so as to engage the workpiece 102 and secure it to the supporting surface 106 to the workpiece support 104.

To rephrase the foregoing, the distance between shaft 138 and the secured end 118 of the first bar 112 cannot be lengthened due to the aforementioned construction. Therefore, upon the effective lengthening of the second member 114 by rotation of its second end 132 via the eccentric arrangement of the cam 142, such effective lengthening is accommodated by the downward displacement of the displaceable end 120 of the first bar 112. The resulting applied force by the rotation of the handle 144 in a clockwise direction effectively secures the workpiece 102. Release of the workpiece 102 is accomplished by rotation of the handle 144 in a counter-clockwise direction.

Since the first bar 112 is fixedly secure at its secured end 118 to the locking assembly 110, there is prevented lateral or transverse movement of its displaceable end during the machining operation which might otherwise result in the inability to produce a precision machined workpiece 102. The device 100, by employing the displaceable end 120 for securing the workpiece 102, as opposed to the pivotally mounted elements of the prior art, further prevents any movement of the workpiece during the machining operation. A machine cutting element (not shown), for example, a drill bit, a cutting tool, etc., can perform machining operations on the workpiece 102 through the U-shaped notch 122 of the displaceable end 120 of the first bar 112. The provision of a resilient pad 150 accommodates irregularities in the surface profile of the workpiece 102, while further insuring the securing of the workpiece by means of the device 100.

Although the invention herein has been described with reference to particular embodiments, it is to be understood that these embodiments are merely illustrative of the principles and applications of the present invention. It is therefore to be understood that numerous modifications may be made in the illustrative embodiments and that other arrangements may be devised without departing from the spirit and scope of the present invention, as defined by the appended claims.

What is claimed is:

1. A device for securing a workpiece to a support having a column member, said device comprising a locking assembly securable to a portion of said column member, a first member having a secured end fixedly attached to said locking assembly to prevent relative movement therebetween and a displaceable end adapted for engaging said workpiece upon displacement thereof, a second member having a first end coupled to said first member adjacent said displaceable end and a second end coupled to said locking assembly, and cam means in operative association with said second member for displacing said second member and said displaceable end of said first member while said secured end thereof remains stationary, whereby said displaceable end of said first member is brought into engagement with said workpiece for securing said workpiece to said support.

2. The device of claim 1, wherein said first member comprises a longitudinally extending bar having a notched opening at said displaceable end.

3. The device of claim 1, wherein said displaceable end includes a pad of resilient material adapted for engaging said workpiece.

4. The device of claim 1, wherein said first member is removably secured to said locking assembly.

5. The device of claim 1, further including a first bearing block secured to said first member adjacent said displaceable end for movably coupling said first end of said second member thereto.

6. The device of claim 5, further including a second bearing block secured to said locking assembly for movably coupling said second end of said second member thereto.

7. The device of claim 6, wherein said second member comprises a longitudinally extending bar coupled at said first end and said second end to a corresponding one of said first bearing block and said second bearing block.

8. The device of claim 1, wherein said cam means comprises a shaft supporting a cam about which said second end of said second member is movably coupled for displacing said second end about an eccentric path in response to the rotation of said shaft.

9. The device of claim 1, wherein said first member is constructed to be flexible to accomodate displacement of said displaceable end thereof.

10. The device of claim 1, wherein said locking assembly comprises a pair of open halves pivotally joined together to enclose about said column member, and means for securing said halves in engagement about said column member to prevent relative movement therebetween.

11. The device of claim 10, wherein said securing means comprises a threaded member pivotally attached to one of said halves and adapted to be secured within an opening provided within another of said halves by means of a retaining member received upon said threaded member.

12. The device of claim 11, wherein said another of said halves includes a shoulder adapted for engaging said retaining member for securing said halves about said column member upon increasing threaded engagement of said retaining member with said threaded member.

13. A device for securing a workpiece to a support having a column member, said device comprising a locking assembly securable to a portion of said column member, a flexible first member having a secured end fixedly attached to said locking assembly to prevent relative movement therebetween and a displaceble end adapted for engaging said workpiece upon displacement thereof, a second member having a first end coupled to said first member adjacent said displaceable end and a second end coupled to said locking assembly, and a cam assembly coupling said second end of said second member to said locking assembly about an eccentric path, said cam assembly operative for bringing said displaceable end of said first member into engagement with said workpiece upon movement of said second member by said cam assembly while said secured end thereof remains stationary, whereby said workpiece is secured to said support.

14. The device of claim 13, wherein said first member is removably secured to said locking assembly.

15. The device of claim 13, further including a first bearing block secured to said first member adjacent said displaceable end for pivotally coupling said first end of said second member thereto, and a second bearing block secured to said locking assembly for pivotally coupling said second end of said second member thereto.

16. The device of claim 15, wherein said second member comprises a longitudinally extending bar pivotally coupled at said first end and said second end to a corresponding one of said first bearing block and said second bearing block.

17. The device of claim 13, wherein said cam assembly comprises a shaft supporting an eccentric cam about which said second end of said second member is pivotally coupled for moving said second end about an eccentric path in response to the rotation of said shaft.

18. The device of claim 13, wherein said locking assembly comprises a pair of C-shaped halves pivotally joined together to enclose about said column member, and securing means for securing said C-shaped halves in engagement about said column member to prevent relative movement therebetween.

19. A device for securing a workpiece to a support having a column member, said device comprising a locking assembly releasably securable to a portion of said column member, a longitudinally extending flexible first member having a secured end fixedly attached to said locking assembly and a displaceable end adapted for engaging said workpiece upon displacement thereof, said first member constructed to be flexible to accommodate displacement of said displaceable end, a first bearing block secured to said first member adjacent said displaceable end, a second bearing block secured to said locking assembly, a longitudinally extending second member having a first end coupled to said first bearing block and a second end coupled to said second bearing block, and a cam assembly coupling said second end of said second member to said second bearing block, said cam assembly comprising a shaft supporting a cam about which said second end of said second member is coupled for movement about an eccentric path in response to the rotation of said shaft, said cam assembly operative to bring said displaceable end of said first member into engagement with said workpiece upon movement of said second member while said secured end thereof remains stationary, whereby said workpiece is secured to said support.

* * * * *